(12) United States Patent
Voice et al.

(10) Patent No.: US 10,532,654 B2
(45) Date of Patent: Jan. 14, 2020

(54) ANTI-SLOSH DEVICE AND METHOD FOR A LIQUID CONTAINER

(71) Applicant: JAGUAR LAND ROVER LIMITED, Warwickshire (GB)

(72) Inventors: Glen Voice, Whitley (GB); Michael Powell, Whitley (GB); Doran Chesters, Whitley (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 167 days.

(21) Appl. No.: 15/551,324

(22) PCT Filed: Feb. 22, 2016

(86) PCT No.: PCT/EP2016/053641
§ 371 (c)(1),
(2) Date: Aug. 16, 2017

(87) PCT Pub. No.: WO2016/135083
PCT Pub. Date: Sep. 1, 2016

(65) Prior Publication Data
US 2018/0029470 A1      Feb. 1, 2018

(30) Foreign Application Priority Data

Feb. 23, 2015 (GB) .................................. 1503000.0

(51) Int. Cl.
*B60K 15/077*      (2006.01)
(52) U.S. Cl.
CPC .... *B60K 15/077* (2013.01); *B60K 2015/0775* (2013.01)

(58) Field of Classification Search
CPC .......... B60K 15/077; B60K 2015/0775; B65D 90/52
(Continued)

(56) References Cited

U.S. PATENT DOCUMENTS 4,974,743 A * 12/1990 Sasaki .................. B60K 15/077
220/363
6,032,347 A * 3/2000 Behr .................... B60K 15/077
220/563

(Continued)

FOREIGN PATENT DOCUMENTS

CN        101445052 A     6/2009
CN        101583402 A     11/2009
(Continued)

OTHER PUBLICATIONS

Chinese First Search Report for Application No. 201680010759.5 dated Dec. 12, 2018.
(Continued)

*Primary Examiner* — Anthony D Stashick
*Assistant Examiner* — L E Kmet
(74) *Attorney, Agent, or Firm* — Carlson, Gaskey & Olds (57) ABSTRACT

A liquid container has a plurality of resilient liquid permeable bodies inserted via an aperture and attached to a mounting by a tether, so as to interrupt the free flow of liquid within the container and prevent noise and vibration resulting from the contained fluid sloshing. A method describes how the anti-slosh device can be installed into a liquid container and how the device can be retrofitted to any liquid container.

20 Claims, 10 Drawing Sheets

(58) Field of Classification Search
USPC .......................................................... 220/734
See application file for complete search history.

(56) References Cited

U.S. PATENT DOCUMENTS

| | | |
|---|---|---|
| 2001/0013366 A1 | 8/2001 | Spickelmire et al. |
| 2004/0134916 A1 | 7/2004 | Baumbacigno |
| 2009/0078705 A1* | 3/2009 | Ramsay ............... B60K 15/077 220/562 |
| 2009/0133762 A1* | 5/2009 | Watanabe ............ B60K 15/077 137/565.01 |
| 2011/0017748 A1* | 1/2011 | Palma .................. B60K 15/077 220/562 |
| 2011/0278305 A1 | 11/2011 | Chun |
| 2014/0366969 A1 | 12/2014 | Chaussin |

FOREIGN PATENT DOCUMENTS

| | | |
|---|---|---|
| CN | 202717233 U | 2/2013 |
| DE | 19729818 A1 | 1/1999 |
| EP | 2065245 A1 | 6/2009 |

OTHER PUBLICATIONS

Combined Search and Examination Report under Sections 17 and 18(3) for Application No. GB1503000.0 dated Aug. 11, 2015.
International Search Report and Written Opinion of the International Searching Authority for International application No. PCT/EP2016/053641 dated Aug. 21, 206.

\* cited by examiner

ANTI-SLOSH DEVICE AND METHOD FOR A LIQUID CONTAINER

TECHNICAL FIELD

The present disclosure relates to an anti-slosh device and method for a liquid container, in particular a liquid tank of a vehicle. Aspects of the invention relate to a container, to a method and to a vehicle.

BACKGROUND

To interrupt the free movement of liquid in a container it is known to have baffles affixed within the container. The baffles interrupt the motion of the contained liquid so as to prevent unwanted 'movement' of the liquid inside the container, and resulting noise. However, to affix baffles inside a container may be costly and may restrict the methods of manufacture of liquid containers.

For example, it is difficult to mould baffles inside a blow moulded container and it may be impractical to provide fins. Baffles can often be provided in a two part container but an assembly process is then required and this may increase complexity.

It would be beneficial to interrupt the free flow of a liquid in a more adaptable manner in blow moulded containers. It would also be beneficial to be able to fit or retrofit liquid containers of any kind with a device to interrupt the free flow of liquid, and thus prevent noisy sloshing. It is known to fill a liquid container with semi-rigid, hollow thin wall bodies, each such body having a plurality of openings in the wall thereof to restrict the free flow of the liquid within the container. A disadvantage of this solution is that the bodies reduce the volume of the container; the bodies must also be capable of insertion through an opening of the container.

It is also known from US2009/0133762 A1, to affix a wire by both ends within a liquid container, and to provide a series of foam cylinders on the wire to interrupt the free flow of a liquid in the vicinity of the wire.

SUMMARY OF THE INVENTION

According to one aspect of the invention there is provided a liquid container having an aperture. The container may comprise therein a mounting point, a plurality of liquid permeable bodies, and a plurality of flexible tethers for retaining said permeable bodies. Each tether may have a respective captive end attached to said mounting point.

Containers according to embodiments of the present invention can be relatively inexpensive, the invention being applicable to, inter alia, blow moulded liquid containers, and can be suitable for retrofitting to liquid containers of any kind. A particular advantage is that the effective volume of the liquid container is not substantially reduced.

In use the tethered permeable bodies have substantial freedom of movement within the container, to interrupt the free movement of the liquid and thereby dampen or prevent the transmission of unwanted noise and vibration, particularly the noise of liquid impacting on an external wall of a container Permeability of the bodies avoids a substantial reduction in liquid volume of the container.

In an embodiment the container is a liquid tank of a vehicle, having a volume in the range 3-150 litres. The mounting may comprise a protruding post on which each tether is mounted in sequence, each tether being free to move axially on the post and in rotation. The post may comprise a threaded fastener mounted to or through the wall of the container.

The liquid permeable bodies are of sufficient size to disrupt sloshing of liquid and may have a transverse dimension in the range 40-150 mm. Each such body may be waisted for convenient attachment of a tether. In an embodiment the bodies are resilient and compressible, so as to be insertable through a small aperture of the container before expanding to full size when on the inside. The liquid permeable bodies are adapted for free movement within the container and typically have a maximum transverse dimension which is less than half the minimum transverse dimension of the container. The number and size of permeable bodies can readily be selected and/or adjusted to provide an empirical solution to liquid sloshing.

In an embodiment the liquid permeable bodies are made of expanded plastic mesh material. Expanded plastic mesh may for example be produced by slitting plastic sheet in a pre-determined pattern, and then stretching the sheet to produce a desired aperture/hole size for the mesh.

Each tether is flexible and substantially inextensible. In one embodiment a tether is a plastic cable tie of conventional form. Any material capable of prolonged immersion in a container, and of appropriate strength and fatigue life as determined by the skilled person, may be suitable. The tether may for example be a single filament, a braided length, a woven length or a tape. In one embodiment the tether is doubled around a liquid permeable body, and has both free ends constituted by eyes for attachment to an in-tank mounting. Several tethers of different length may be attached to said mounting to obtain a desired distribution within the container.

In use the liquid permeable bodies are carried by sloshing liquid to that part of the container which receives a sloshing impact, and accordingly can be arranged to ameliorate unwanted sloshing noise in any region of a container.

According to another aspect of the invention there is provided a method of mitigating sloshing of liquid in a container. The method may comprise providing a mounting within a liquid container. The method may comprise providing within said container a plurality of liquid permeable bodies. The method may comprise tethering said bodies to said mounting.

Unwanted sloshing of liquid is prevented because the liquid permeable bodies interrupt the free flow of the liquid inside the container. The kinetic energy of the moving liquid is reduced, and consequently the noise and vibration of impact of liquid with the container wall is also reduced.

According to a further aspect of the invention there is provided a method of fitting a refillable container with an anti-slosh device to mitigate noise and vibration caused by liquid sloshing. The method may comprise providing a mounting within the container. The method may comprise inserting a plurality of liquid permeable bodies via an aperture of the container. The method may comprise tethering said bodies to the said mounting.

In an embodiment the liquid permeable bodies are a resilient compressible mass. To retrofit into a container the bodies are inserted via an existing aperture in the container, for example a filler pipe or an aperture for a level gauge or pump; once inside the tank the bodies assume their unrestricted volume and can be tethered to a mounting which has been provided in the tank. Unwanted sloshing is prevented because the liquid permeable bodies interrupt the free flow of the liquid inside the container. The kinetic energy held by the liquid is reduced and the resulting noise and vibration of impact with the container wall is ameliorated.

According to some, but not necessarily all, examples of the present disclosure there is provided a liquid container having an aperture. The container may comprise therein a mounting point, a plurality of liquid permeable bodies, and one or more flexible tethers for retaining said permeable bodies. Each tether may have a respective captive end attached to said mounting point.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

One or more embodiments of the invention will now be described, by way of example only, with reference to the accompanying drawings, in which.

DESCRIPTION OF EMBODIMENTS OF THE INVENTION

Figure 1:
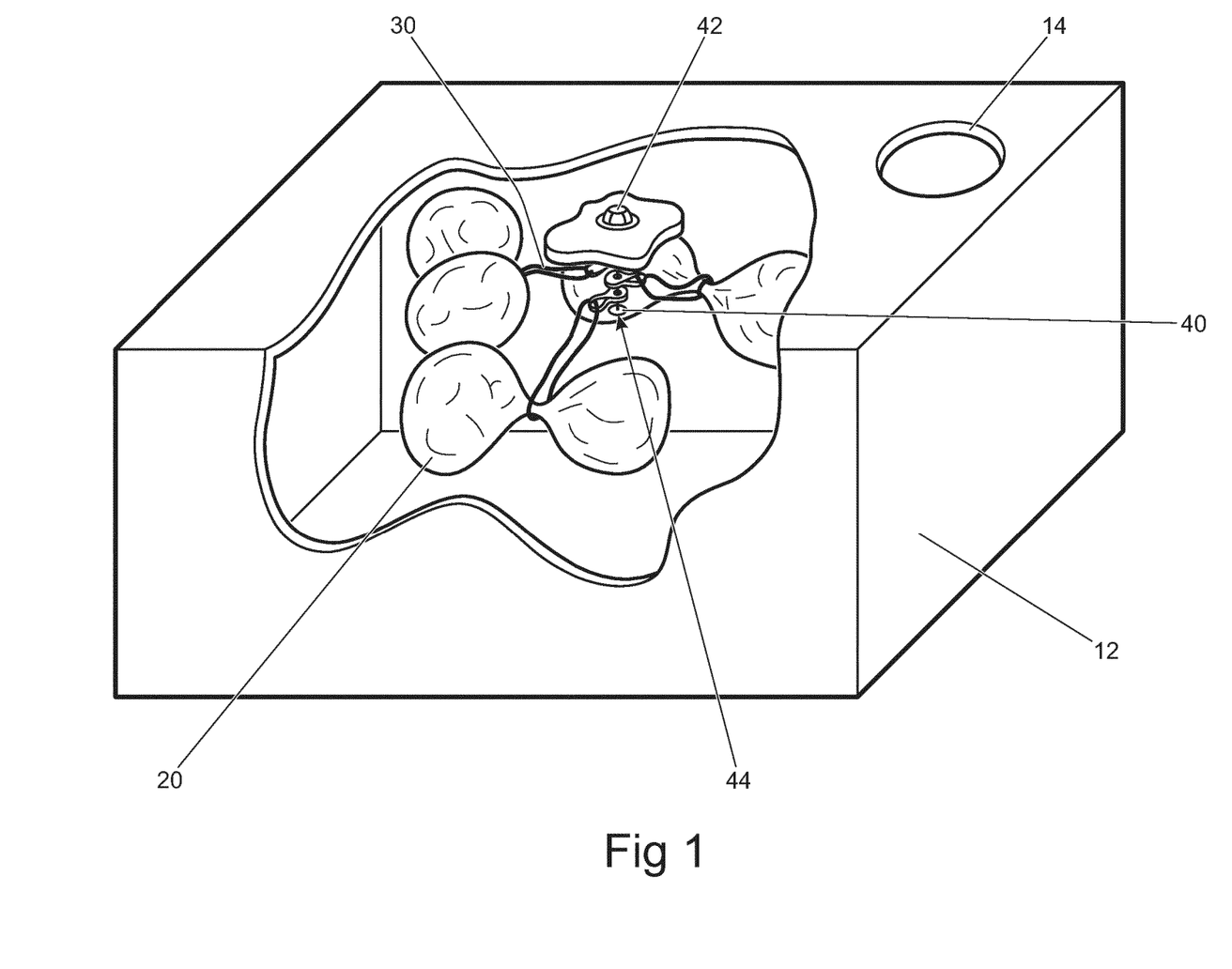
FIG. 1 shows a cut-away liquid container of an embodiment of the invention.

FIG. 1 shows a liquid container of an embodiment of the invention, which is cut-away to expose the internal components.

Referring to FIG. 1 there is provided, a somewhat rectangular liquid container 12, a plurality of liquid permeable bodies 20, tethers 30, a mounting 40, a cap 42, a star washer 48 (FIG. 2), and, an aperture 14.

The illustrated liquid container 12 may have a volume of about 65 litres, a height of 200 mm, a length of 800 mm and a width of 400 mm. The tank is for example blow moulded of high density polyethylene, but may be, for example, be constructed of two half shells, of metal or plastic. Any suitable material and method of construction may be employed and the shape of the container may be adapted to the space in which the container is to be located.

Each liquid permeable body 20 comprises an outer skin of a heavy duty polyethylene mesh and a filler material which is, for example, a lightweight polyethylene mesh; it may have a volume in the range 1-3 litres, as defined by the outermost boundary thereof. The body 20 is waisted, so as to have enlarged ends of a somewhat ball-like shape.

Figure 2:
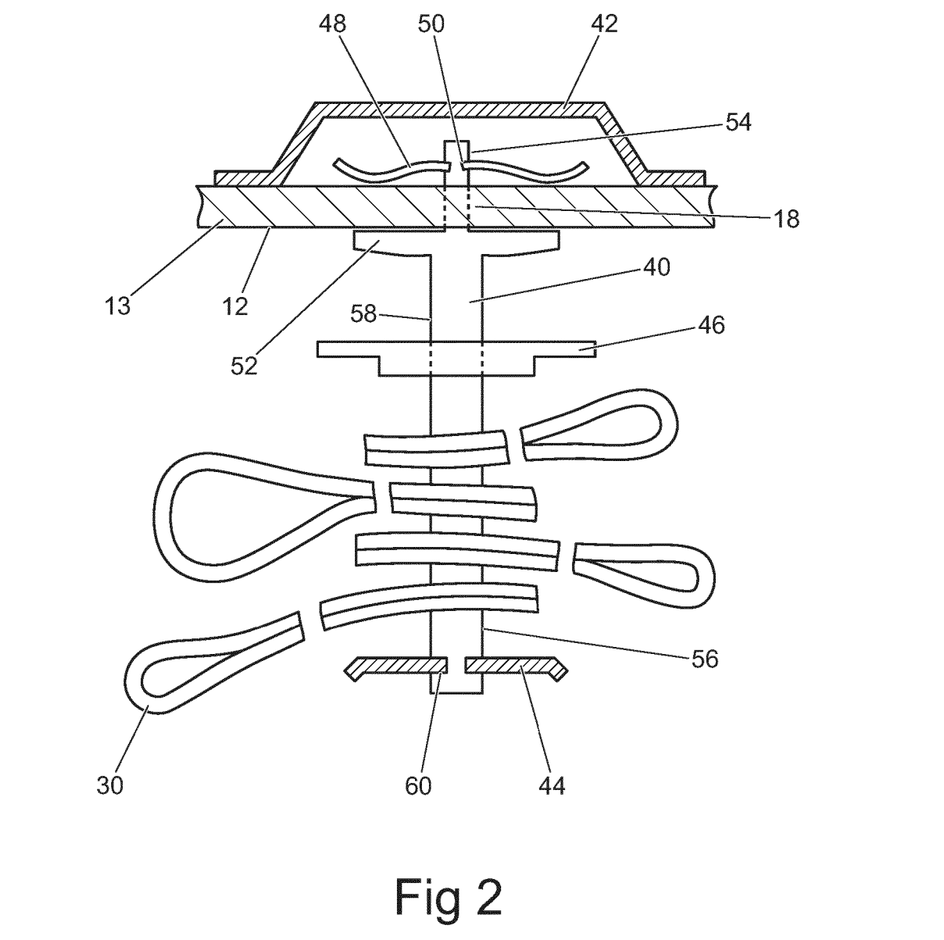
FIG. 2 is a cross section of a mounting point for the container of FIG. 1.
Figure 5:
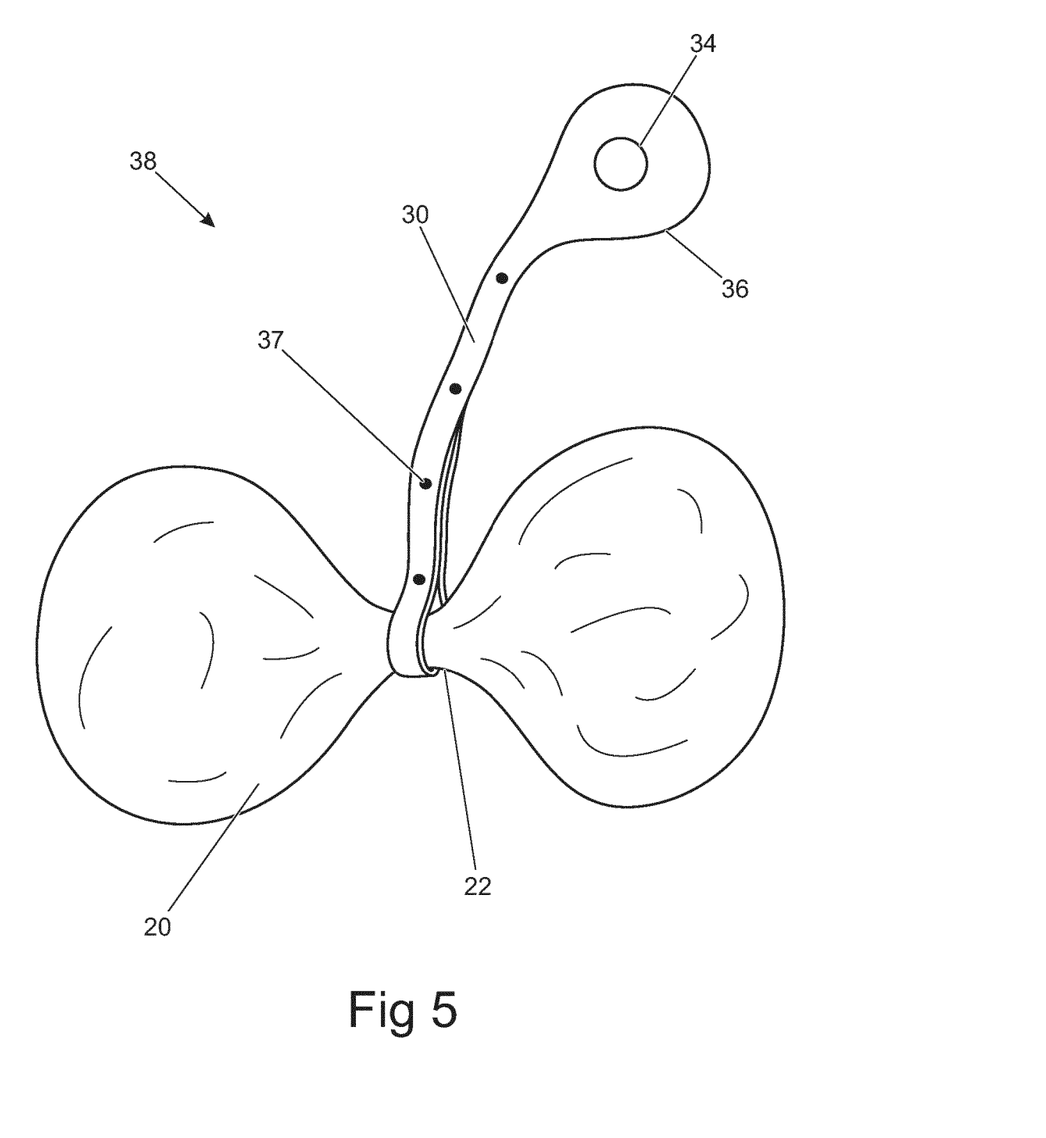
FIG. 5 shows an exemplar liquid permeable body and a tether for use in an embodiment of the invention.
Figure 7:
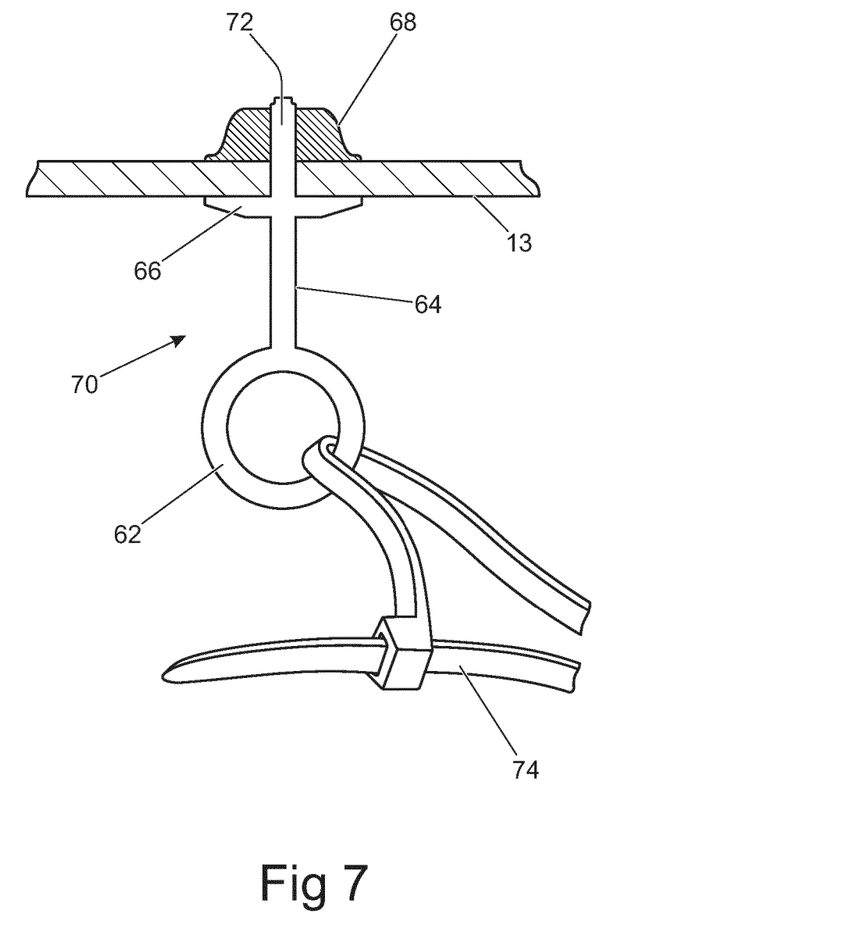
FIG. 7 shows an alternative mounting for use in an embodiment of the invention.

Each tether 30, is 300 mm long and has one end attached to the waisted portion of a liquid permeable body 20. The tether 30 is ribbon-like with a width of for example 5 mm and a thickness of for example 2 mm. The tether 30 is for example of nylon. Referring to FIG. 5, the tether 30 has a hole 34 at both ends so that it can be doubled around the waisted portion of the body 20 and attached to the mounting 40 as is shown in FIG. 2, or it may be a cable tie 74 as is shown in FIG. 7.

The aperture 14 may be an inlet and/or an outlet and may be adapted for mounting of a pump (not shown). In one embodiment the container is a urea tank of a vehicle having an internal combustion engine.

In the arrangement of FIG. 1, the mounting 40 is a depending post, comprising a male fastener having a flange head and a screw thread. The depending post is inserted from the outside into the liquid container through a hole 18 in the wall thereof. The mounting 40 is secured in position using a threaded female fastener and a flat washer, not shown, from the inside of the tank, trapping and sealing the tank wall between the flat washer and the flange on the head of the threaded male fastener. Once the mounting is in position and secured to the liquid container wall, an optional cap 42 may be welded over the protruding section of the mounting 40 so as to ensure that the liquid container 12 is fluid tight in the region of the mounting.

A sub-assembly comprises a tether 30, attached to the liquid permeable body 20, and is inserted into the liquid container 12 via the aperture 14. The free ends of the tether 30, are attached to the mounting 40. A further three such tethers 30, with respective liquid permeable bodies 20, are attached sequentially to the mounting 40. The tethers 30 are retained onto the mounting 40 by a suitable fixing, and are free to move along the mounting 40 and to rotate around the mounting 40.

In use the tank contains fluid, for example urea or fuel. The liquid permeable bodies 20 will be wholly or partially submerged in the liquid. During use the liquid container 12 will gradually empty as the urea is withdrawn, and at certain volumes the urea may slosh around inside the tank and create unwanted noise. The noise produced is a result of the liquid within the tank gaining kinetic energy as it is thrown from one side of the tank to the other. When the liquid hits the wall of the tank the kinetic energy is converted into sound energy and a noise is produced. Typically the loudest noise can be heard when the tank is about three quarters full. However, as the liquid permeable bodies are somewhat submerged within the liquid in the tank, the free flow of the liquid is interrupted, and the kinetic energy of the liquid is dispersed as the liquid passes through the mesh construction of the liquid permeable bodies. The operation of this embodiment is such that by reducing the velocity with which the liquid travels from one side of the tank to the other, the kinetic energy of the liquid is reduced and there is less energy to be converted to sound energy; the resulting impact noise of the liquid hitting the wall of the tank is accordingly reduced. The number and distribution of liquid permeable bodies may be varied empirically until unwanted sloshing noise is sufficiently ameliorated.

Referring to FIG. 2, a cross section of a different mounting 40 is shown. The mounting 40 constitutes a protruding post comprising a stud portion 54, a shoulder portion 52, a shaft portion 56, a fixed abutment 46 and a stem portion 58. The mounting comprises for example nylon grade PA66 GF, which is urea compatible. The stud portion 54 has a diameter of about 6 mm and is proximate the shoulder portion 52 which has a diameter of about 35 mm. On the distal end of the stud portion 54, relative to the shoulder portion 52, is a radial groove 50 which is adapted to receive one-way spring attachment clip 48. Proximate the shoulder portion 52 is a stem portion 58 with a cross sectional diameter of about 8 mm. The stem portion 58 has a moulded fixed abutment 46 which has a cross sectional diameter of about 40 mm. Proximate the fixed abutment 46 is a shaft portion 56 with a cross sectional diameter of about 8 mm. On the distal end of the shaft portion relative to the fixed abutment 46 is a radial groove 60 which is adapted to receive a one-way star washer 44. The stud portion 54 has an axial length of about 20 mm, the shoulder portion 52 has an axial length of about 8 mm, the stem portion 58 has an axial length of about 30 mm, the fixed abutment 46 has an axial length of about 8 mm, and the shaft portion 56 has an axial length of about 65 mm. The stated dimensions are examples only, and may be varied accordingly to material and the required size and strength of the mounting.

FIG. 2 shows the mounting 40 in position in a liquid container 12 having a wall 13 about 9 mm thick. The stud portion 54 of the mounting 40 is inserted into a hole 18 in the liquid container wall 13. The shoulder portion 52 of the mounting 40 abuts the inside of the liquid container wall 12. In this position the stud portion 54 protrudes sufficiently out of the hole 18 so that a sprung retaining clip can be seated in the groove 50. The retaining clip 48 is seated in groove 50 and sprung such that the mounting 40 is under tension axially and the shoulder portion 52 abuts the inside of the liquid container wall 13 tightly. With the retaining clip 48 in place and the mounting 40 secured inside the liquid container 12, and if necessary a cap 42 is welded in position over the protruding stud portion 54 and retaining clip 48 to provide a fluid seal. A plurality of nylon tethers 30 are attached to the shaft portion 56 of the mounting 40. A star washer 44 is seated in the groove 60 on the distal end of the shaft portion 56 of the mounting 40 relative to the shoulder portion 52. The star washer 44 prevents the tethers 30 from sliding off/becoming detached from the shaft portion 56 whilst allowing them freedom to move axially on the shaft portion 56. The fixed abutment 46 limits how far the tethers are free to travel axially on the shaft portion 56. For reasons of clarity, FIG. 2 omits the liquid permeable bodies 20.

Figure 3:
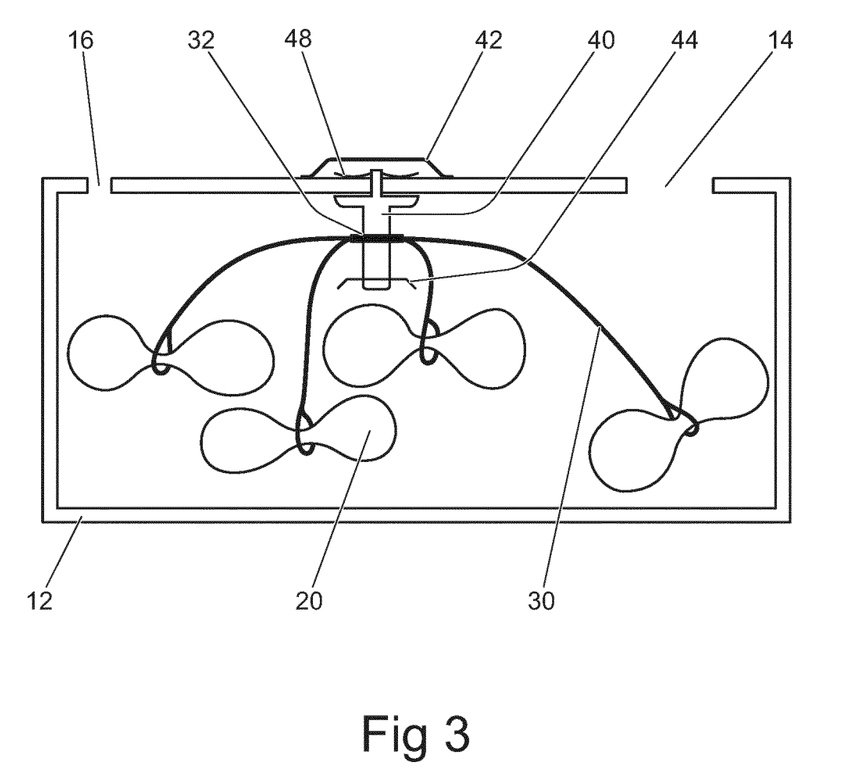
FIG. 3 shows a liquid container of another embodiment of the invention.

FIG. 3 shows another embodiment where a plurality of tethers 30 are connected to a single annular tether mount 32 of polyethylene, which is free to move axially and rotationally on a protruding mount 40. A separate inlet 16 of the liquid container 12 is adapted to receive a filler neck (not shown) for filling the liquid container 12 when it is in use. The liquid permeable bodies are in use inserted through an outlet 14.

Figure 4:
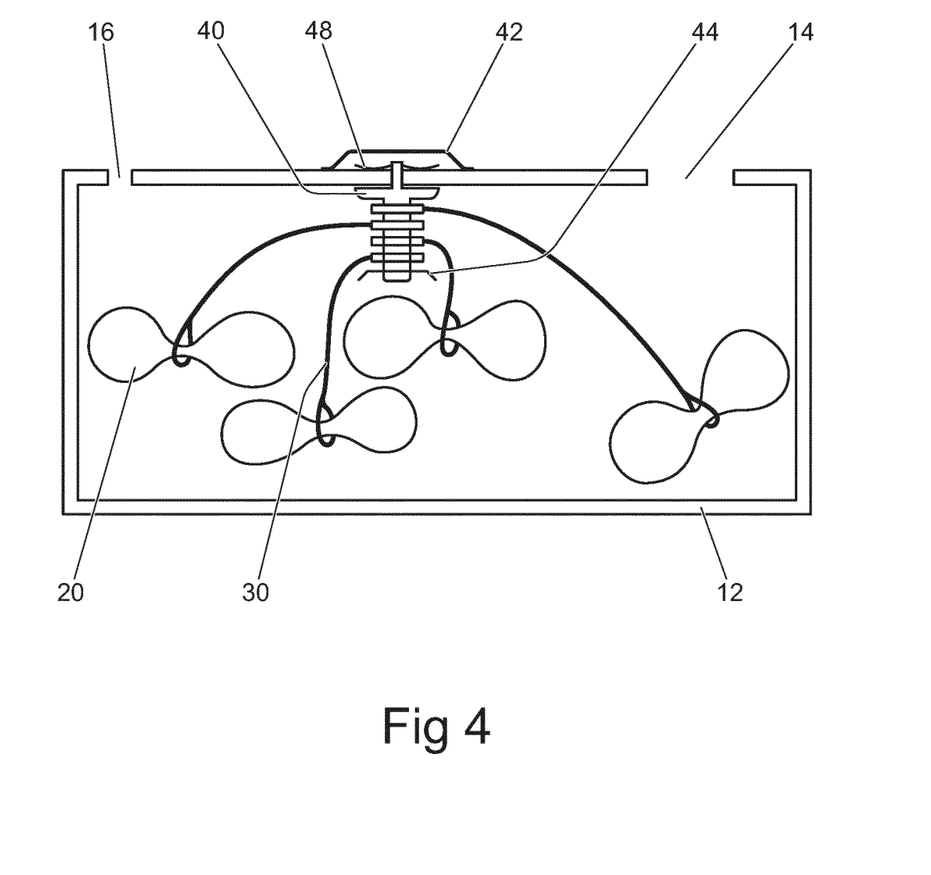
FIG. 4 shows a liquid container of yet another embodiment of the invention.

FIG. 4 is a cross section of a liquid container showing the arrangement of the tethers 30, arranged sequentially on the mounting 40. FIG. 4 illustrates that the length of the tethers 30 is sufficient to allow at least one liquid permeable body 20, to reach to the furthest point within the liquid container 12, and that the tethers 30 may be of differing lengths to best orientate the liquid permeable bodies 20 within the liquid container 12, for example to ensure progressive disruption of slosh energy.

FIG. 5 shows in more detail, a sub assembly 38 comprising a dumbbell shaped liquid permeable body 20 with a waisted portion 22, and a tether 30. The tether 30 is made from a polyethylene material and is of about 250 mm in length. The tether has a tether end 36 with a diameter of about 18 mm and a 9 mm hole 34. The tether 30 has a series of spot welds 37 which join the doubled-over tether so that the liquid permeable body 20 cannot escape. The spot welds 37 are shown merely as an example of a means of preventing the liquid permeable body from becoming detached from the tether 30, any suitable means may be employed to retain the body 20. The tether end hole 34 is adapted to receive the shaft portion of mounting point 40. The liquid permeable body comprises an outer skin made from heavy duty polyethylene mesh and inner filler made of lightweight polyethylene mesh bunched inside the outer skin, so as to provide a squashable resilient mass having a substantial interstitial space.

Figure 6:
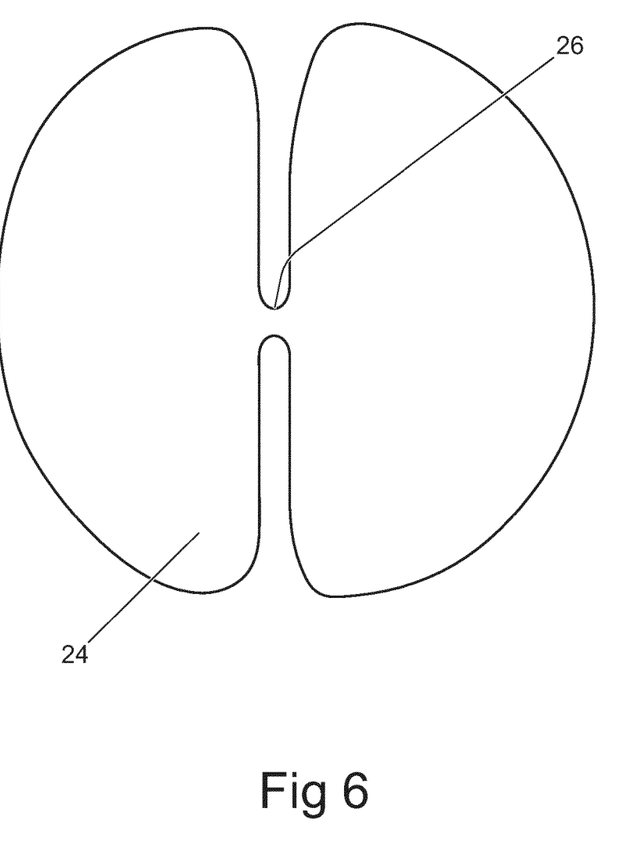
FIG. 6 shows an alternative liquid permeable body for use in an embodiment of the invention.

FIG. 6 shows the cross section of an alternative substantially spherical liquid permeable body 24, with a waisted portion 26.

FIG. 7 shows a ring mounting 70 in position in a liquid container 12 with a wall 13 of thickness of about 10 mm. The 8 mm diameter stud portion 72 of the mounting 70 is inserted into a hole 18 in the liquid container wall 13. The shoulder portion 66 of the mounting 70 abuts the inside of the liquid container wall 12 and has a diameter of about 45 mm. In this position the stud portion 72 protrudes sufficiently out of the hole 18 so that a female threaded flange nut 68 can be tightened on the threaded stud portion 72, affixing the ring mounting 70 to the tank wall 13 and sealing the hole 18. A shaft portion 64 of length about 40 mm and diameter about 8 mm is proximate the shoulder portion 66 and annular portion 62. The annular portion 62 has an inside diameter of about 30 mm and an outside diameter of about 35 mm and is adapted to receive one or a plurality of tethers 30. In this embodiment, for example, the tether 30 comprises a 350 mm nylon cable tie 74 but any suitable tethering means may be employed by the skilled person.

Figure 8:
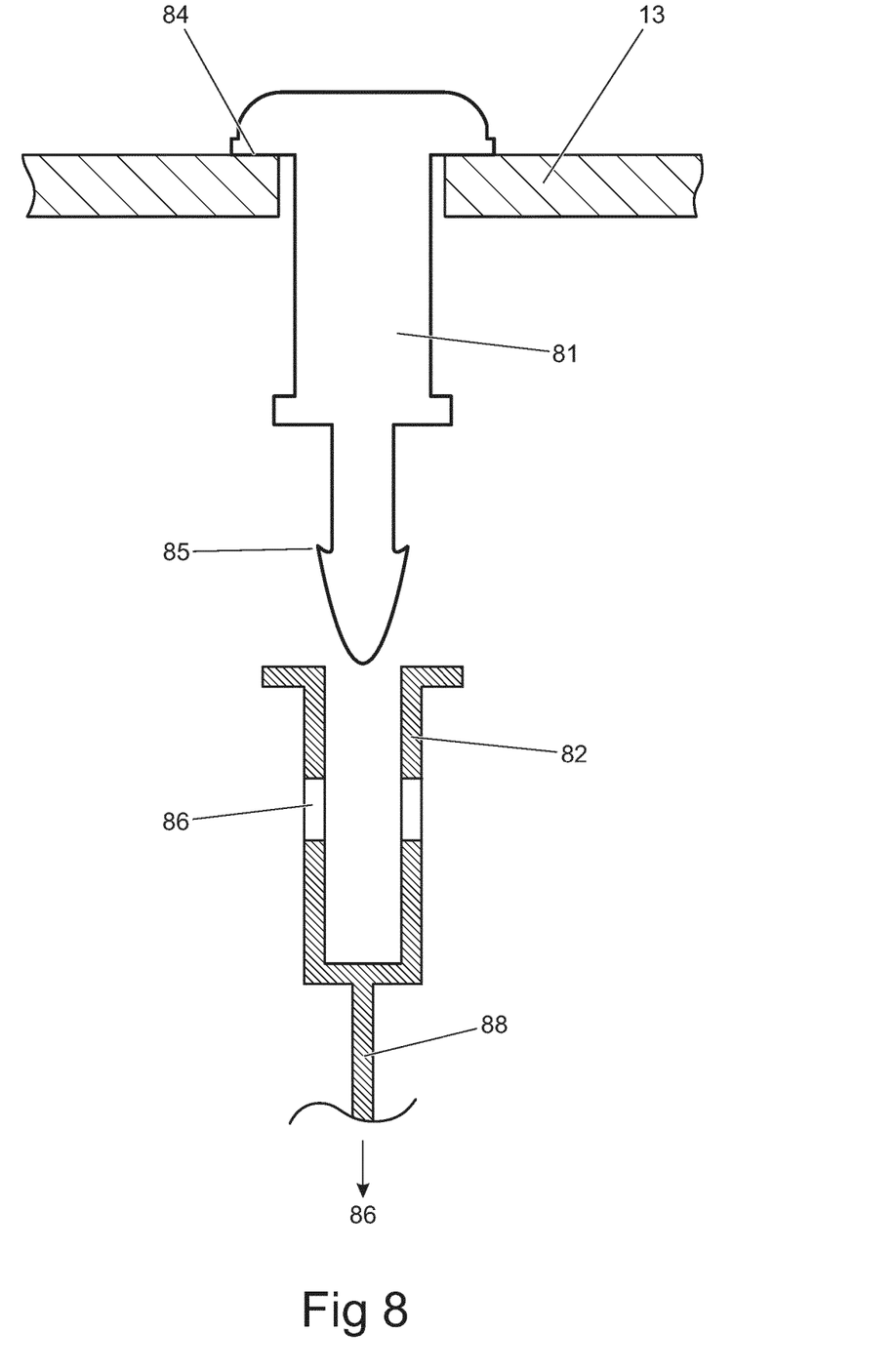
FIG. 8 shows a further alternative mounting for use in an embodiment of the invention.

FIG. 8 shows a cross section of a two-component, push-connector mounting. The connector comprises a post 81 which is inserted through the outside of the liquid container wall 13 and fixed in place by weld 84 which also serves to reseal the liquid container. A plurality of liquid permeable bodies 86, are attached to a tether connector 82 via an integral tether 88. Tether connector also called socket 82 may be configured to attach to connector also called plug 81 by a snap fit device 85, 86.

Figure 9:
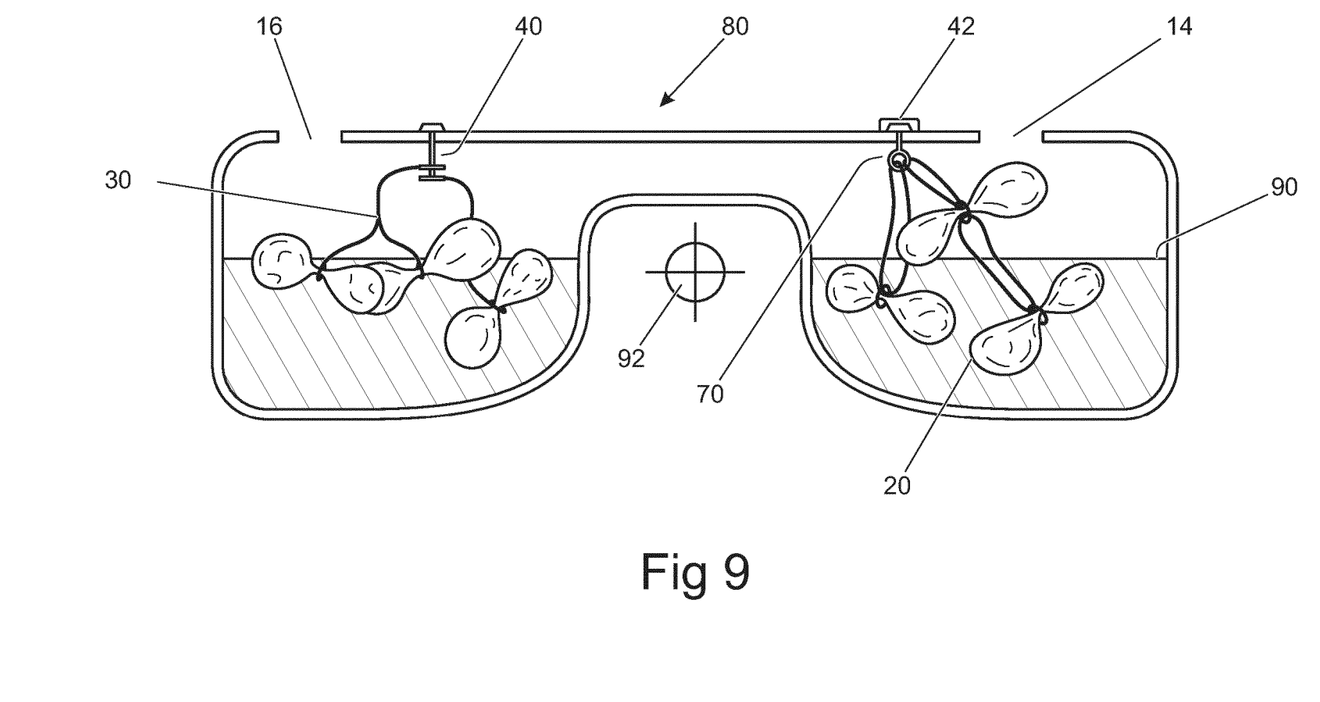
FIG. 9 shows the cross section through a saddle tank incorporating an embodiment of the invention.

FIG. 9 shows a cross section of a 75 litre saddle fuel tank 80, which comprises a post mounting 40, a filler inlet 16, a pump mounting aperture 14, mountings 40, 70, caps 42, a plurality of tethers 30, and a plurality of liquid permeable bodies 20. A saddle tank 80 may be necessary to meet the packaging requirements of a specific vehicle application, for example where the tank is situated over a vehicle drive shaft 92. A saddle tank 80, may require two mounting points 40, 70, on which independent clusters of liquid permeable bodies 30 are attached. FIG. 9 illustrates that the liquid permeable bodies 20 have a neutral buoyancy and may be partially or wholly submerged in the fluid 90.

Figure 10:
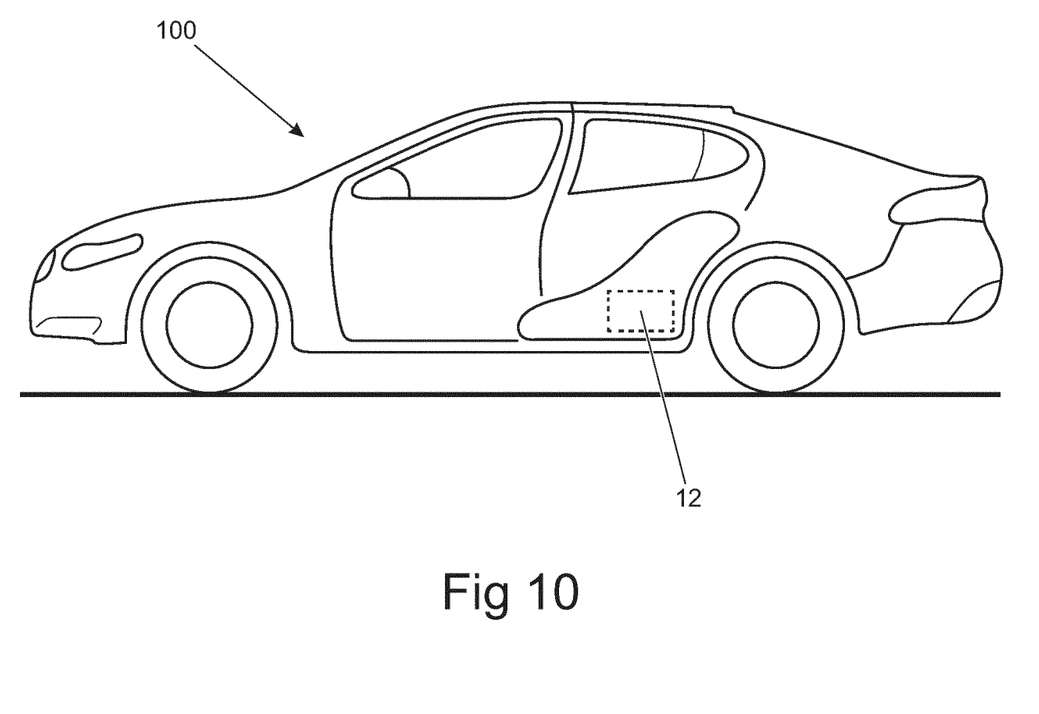
FIG. 10 shows a vehicle containing a liquid container according to the present invention.

FIG. 10 shows a vehicle 100 with a cut away panel displaying the location of a liquid container 12.

The skilled person will select an appropriate type of tank of a suitable material for the task along with appropriately dimensioned tethers and permeable bodies. A tether mounting may be in one or more positions within a liquid container and may be of a post type or a ring/post type, or of other type suitably adapted for attaching one or more tethers within the liquid container. The embodiments provide an inexpensive solution adaptable to a wide range of liquid containers in a variety of shapes and constructions, the mounting, tether and liquid permeable body can be configured to interrupt flow within new liquid containers but also lends itself to retrofitting to containers which are in use.

The invention claimed is:

1. A liquid container having an aperture and comprising within the container:
   a mounting;
   a plurality of liquid permeable bodies; and
   a plurality of flexible tethers for retaining said permeable bodies, at least one of the tethers having a captive end attached to said mounting and an opposite, free end that is free to move within the container, wherein each of the tethers has a free end that is free to move within the container and each of the tethers supports at least one of the liquid permeable bodies near the free end.

2. A liquid container according to claim 1, wherein said liquid permeable bodies comprise expanded plastics material.

3. A liquid container according to claim 1, wherein said liquid permeable bodies comprise expanded polyethylene mesh.

4. A liquid container according to claim 1, comprising a capacity of between 3 and 150 litres.

5. A liquid container according to claim 1, wherein said mounting is accessible via said aperture for attachment of said plurality of tethers.

6. A liquid container according to claim 1, wherein the mounting is a protruding post on an inside of said container.

7. A liquid container according to claim 6, wherein said protruding post is installed through a container wall from an outside of the liquid container.

8. A liquid container according to claim 1, wherein at least one of the tethers is attached to a plurality of liquid permeable bodies.

9. A liquid container according to claim 1, wherein at least one of the tethers is adapted for removable attachment to said mounting.

10. A liquid container according to claim 1, wherein the length of at least one of the tethers is not more than 10 times a maximum transverse dimension of a liquid permeable body retained by the at least one of the tethers.

11. A liquid container according to claim 1, wherein one or more of the tethers extends substantially from said mounting to a furthest point of the liquid container.

12. A liquid container according to claim 1, wherein at least one of the liquid permeable bodies comprises a substantially spherical portion.

13. A liquid container according to claim 1, wherein at least one of the liquid permeable bodies comprises a waisted portion.

14. A liquid container according to claim 1, wherein each of said liquid permeable bodies defines a substantially encapsulated volume of between 0.25 and 7 litres.

15. A liquid container according to claim 1, wherein said liquid permeable bodies are substantially free to move with respect to each other.

16. A vehicle having the liquid container of claim 1.

17. A method of fitting a refillable container with an anti-slosh device to mitigate noise and vibration caused by liquid sloshing, the method comprising:
   providing a mounting within the container;
   inserting a plurality of liquid permeable bodies through an aperture and into the container; and
   tethering the bodies to the mounting using tethers, at least one of the tethers having one captive end attached to the mounting and an opposite free end that is free to move within the container, wherein each tether has a free end that is free to move within the container and each tether supports at least one of the liquid permeable bodies near the free end.

18. A liquid container having a container wall and an aperture through the container wall, the container comprising:
   a single mounting distinct from the container wall;
   a plurality of liquid permeable bodies; and
   a plurality of flexible tethers for retaining said permeable bodies, each tether having a captive end attached to said mounting.

19. A liquid container according to claim 18, wherein each tether has a free end that is free to move within the container and each tether supports at least one of the liquid permeable bodies near the free end.

20. A liquid container according to claim 1, wherein
   the container has a container wall;
   the aperture is through the container wall; and
   the mounting is a single mounting distinct from the container wall.

* * * * *